Figure 1:
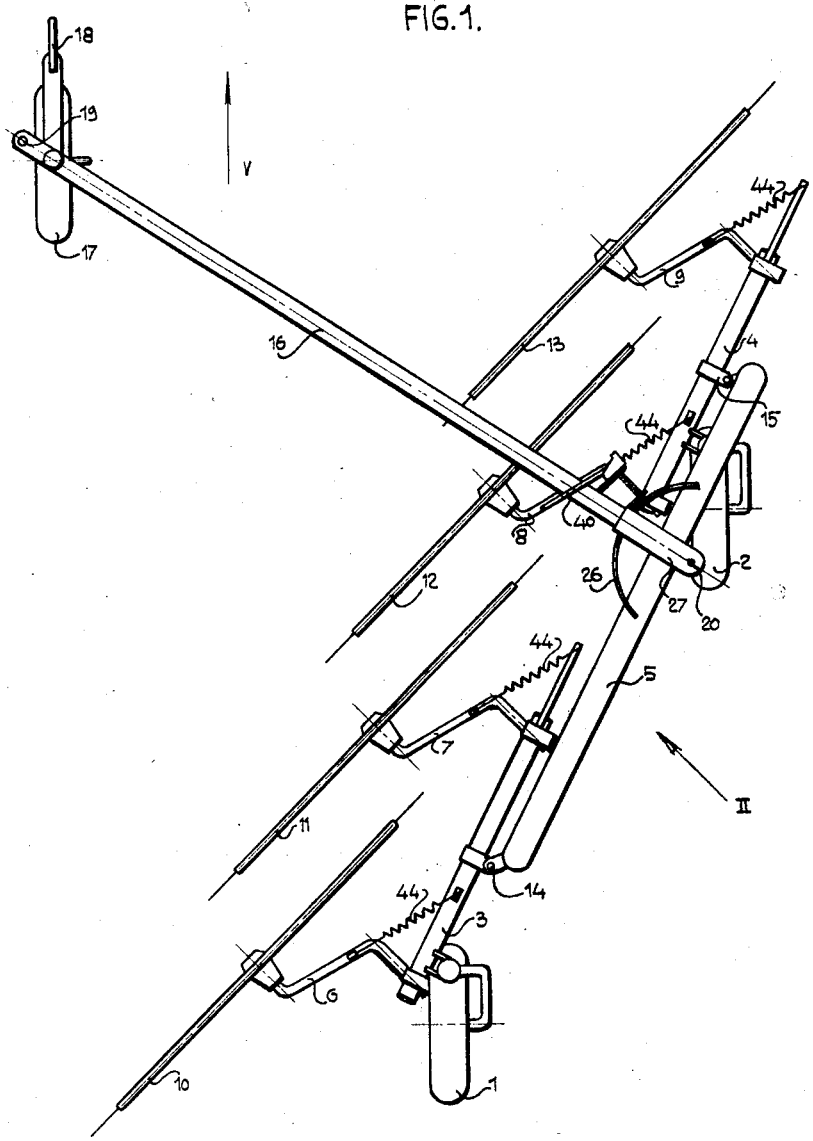

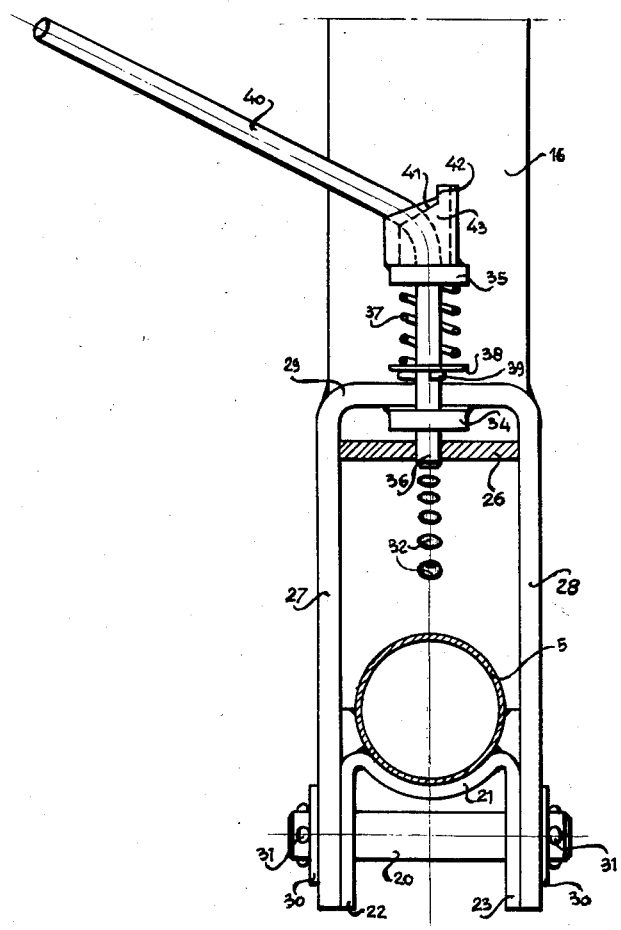

United States Patent Office

2,873,126
Patented Feb. 10, 1959

2,873,126
LATERALLY ADJUSTABLE DRAFT MEMBER

Cornelis van der Lely and Ary van der Lely, Maasland, Netherlands, assignors to C. van der Lely N. V., Maasland, Netherlands, a Dutch limited-liability company Application July 5, 1955, Serial No. 520,017

Claims priority, application Netherlands July 5, 1954

2 Claims. (Cl. 280—462)

The invention relates to a hinged connection between an arm and part of a frame, the arm being provided with a U-shaped fork the legs of which are rotatably fixed to said part of the frame round a common axle passing through the ends of the legs of the fork. Hinged connections of this kind are generally known. The known connections can transmit a force intersecting the hinge pin. When they are provided with a locking device for securing the arm in one or more positions, they can moreover transmit couples in a plane at right angles to the axis of the hinge in that position or in those positions.

It is an object of the invention to provide a hinged connection of the kind mentioned above which is able to transmit a considerable couple in a plane containing the arm and the hinge axis while having a rather small dimension in the direction of the hinge axis. According to the invention the connection is such that the distance between the axis of rotation and that part of the fork, which joins the legs, is greater than the distance between the legs of the fork at the spot of said axis, the part of the frame being provided with a supporting member for these legs, said supporting member being located between the legs of the fork and at least in a number of positions presenting a supporting plane at the sides of the legs of the fork which are turned towards one another close to the part of the fork, which joins the legs, owing to which forces working in the direction of the axis of rotation can be transmitted to the supporting member and thus to the part of the frame.

In a favourable embodiment the supporting member is composed of a piece of profile material which is bent in its longitudinal direction according to a cylinder having the hinge axis as center line, the width of the piece of profile material being equal to the distance between the legs of the fork at the spot of the supporting member. In order to make the connection suitable for transmitting a couple in a plane at right angles to the hinge axis according to the invention the supporting member may be provided with a number of holes or other recesses which can cooperate with a locking means on said arm in order to secure the arm in various positions in relation to the part of the frame. In a special useful application of the invention the part of the frame to which the arm is fastened forms part of the frame of a side delivery rake, swath turner or similar device provided with rake wheels in which the hinged connection is situated on a level with the upper side of the rake wheels so that the arm extends over the wheels, the arm being arranged for receiving the tractive pull for moving the device. As the lower side of the arm, and owing to this also that of the hinged connection, must be situated high in consequence of the presence of the rake wheels, it will be very important here that the connection has a small dimension in the vertical direction in order to obtain an as small as possible height of the construction.

Figure 2:
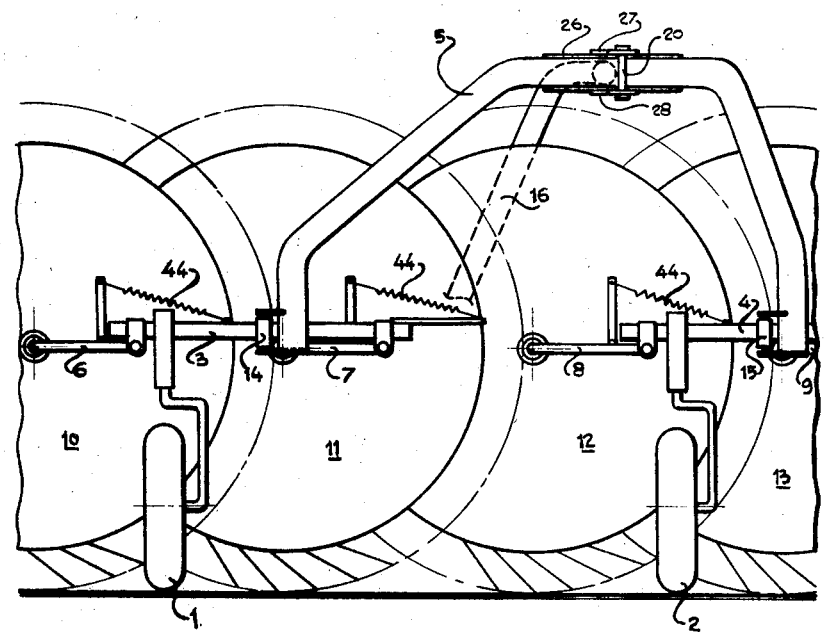
Figure 3:
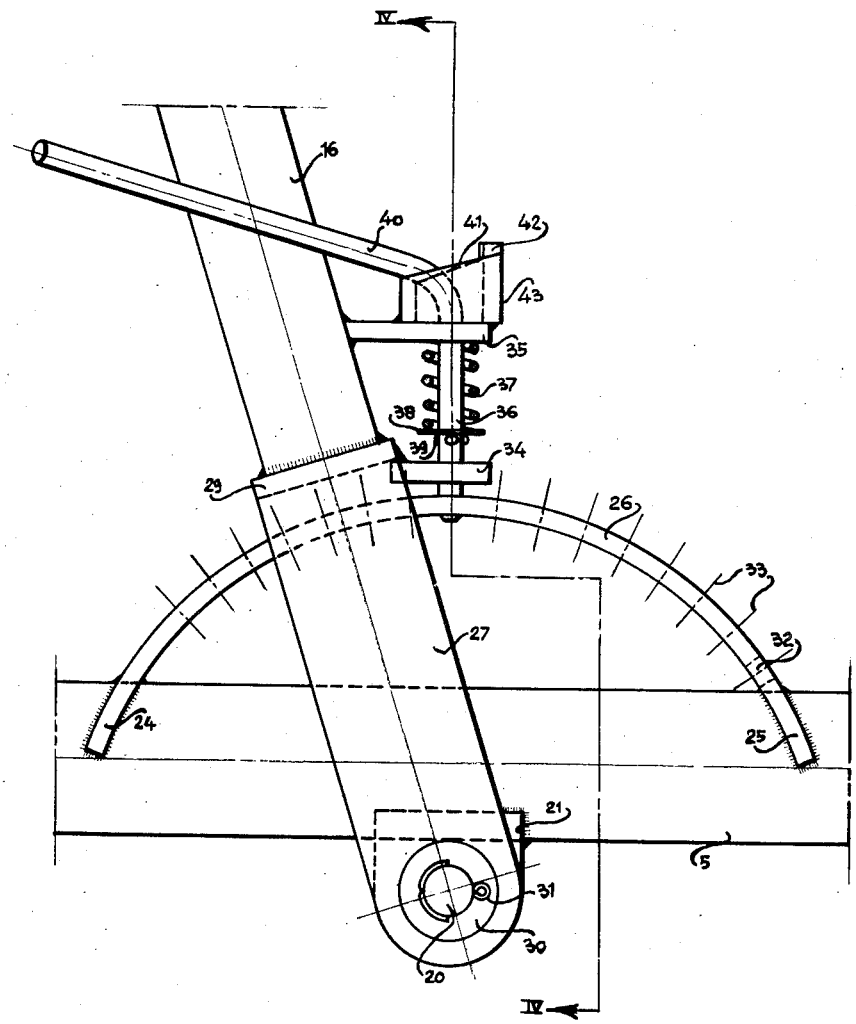

Further features and details will be hereinafter more fully described with reference to the accompanying drawings in which a preferred embodiment of the device according to the invention has been illustrated by way of example and in which:

Fig. 1 is a plan elevation of a side delivery rake which can be converted into a swath turner and which is provided between the frame and the draw arm with a hinged connection according to the invention, Fig. 2 is a side elevation of the same device, viewed in the direction of the arrow II in Fig. 1, Fig. 3 shows a plan view of the hinging connection on a larger scale, Fig. 4 represents a section, partially in side elevation on the line IV—IV in Fig. 3.

According to Figs. 1 and 2 the frame of a side delivery rake consists of two horizontal beams 3 and 4 supported by means of running wheels 1 and 2, which beams 3 and 4 are interconnected by a bow 5. The beams 3, 4, respectively, carry two cranks 6, 7 and 8, 9, respectively, rotatable in bearings fixed to the beam. On said cranks 6–9 rake wheels 10–13 are mounted which are rotatable around the crank pins. The connections of the lower ends of the bow 5 with the beams 3 and 4 are such that said beams are rotatable with regard to the bow around vertical axles 14 and 15. An arm 16 extending over the row of rake wheels 10–13 is hingedly fixed to the upper part of the bow 5 by means of a hinged connection being represented on a larger scale in Figs. 3 and 4. The arm 16 carries at its foremost extremity a running wheel 17 adjusting itself according to the position of a draw hook 18 fixed rotatably to the arm 16 at which draw hook 18 the rake can be drawn on in the direction of travel V. If desired the running wheel 17 may also be taken away after which the extremity of the arm 16 provided with an eye 19 can be fastened to the rear side of a tractor.

According to Figs. 3 and 4 the hinged connection has a joint pin 20 between the arm 16 and the highest part of the bow 5. The bow 5 is composed of a tube upon which a strip 21 is welded at the spot of the connection, the extremities 22 and 23 of said strip 21 being bent backwards so far that they lie in parallel planes. Said lips 22 and 23 are provided with holes in which the pin 20 fits exactly. Further the ends 24 and 25 of a strip 26 arcuated according to a circular cylinder are welded upon the tube constituting the bow 5. The center line of the pin 20 is the axis of the relevant surface of said strip 26, whereas both edges of the strip lie in planes at right angles to said center line.

The arm 16 for the greater part of its length not being tied to a certain profile, on condition that its profile has sufficient great moments of resistance in two mutually perpendicular directions as to resist the bending moments appearing during operation, is close to the hinged point constituted by both legs 27 and 28 of a fork which has been formed by bending a flat, straight strip in the shape of a U. The end of arm 16 is terminated at a right angle to the arm and welded against the part 29 of the strip which part interconnects the legs. Close to the part 29 the distance between the sides of the legs 27 and 28 which are turned towards each other is only a little greater than the width of the arcuated strip 26, the ends of the legs 27 and 28 having a distance which is only a little greater than the distance between the sides of the lips 22 and 23 which sides are turned away from each other. The ends of the legs 27 and 28 are provided with fitting holes for the pin 20. On both sides of the strip 26 the legs 27 and 28 of the arm are pushed over said strip and the tube 5 till the ends of the legs lie beside the lips 22 and 23 after which said ends are fixed to these lips by putting the pin 20 through the four holes. Then the pin now lying in the plane through the legs of the fork is provided at each side with a washer 30 and is fixed by means of split pins 31.

The construction as far as it has now been described, is very favourable for transmitting loads from the arm 16 to the bow 5 in a direction which is parallel to the center line of the pin 20, said loads being caused by a force acting upon the end of the arm 16. While using the device the occurrence of such a force is inevitable and leads to a moment and a shearing force in the hinging connection. The moment is transmitted as a compressive force into one of the legs of the fork 27 and 28 and as a tensile force in the other one. On the other hand there is no need to transmit the shearing force to the pin 20, but it is possible to transmit said force almost directly to the narrow side of the arched strip 26 by means of the leg which is subject to a tensile force. In this way, the legs 27 and 28 do not have to resist any substantial moment and thus need not be of excessively strong material. Owing to the fact that the strip 26 has a not too small distance to the pin 20 said strip 26 is very suitable for being used for securing the arm 16 in a certain position in relation to the bow 5. To that end the arcuated strip 26 is provided with a series of holes 32 a number of them being visible in Fig. 4 and the center lines 33 of which being represented in Fig. 3. Two strips 34 and 35 are welded upon the arm 16 each of said strips being provided with a hole and constituting a guiding for a locking member which is able to cooperate with the holes 32. The locking member is composed of a pin 36 extending through the holes in the strips 34 and 35, said pin 36 carrying between the strips 34 and 35 a helical spring 37 which bears with one side against the strip 35 and lies with the other side against a washer 38 bearing itself against a split pin 39 through the pin 36 so that the spring tends to press the pin 36 against the arcuated strip 36 or to put the pin through any of the holes 32. In order to be able to remove the locking pin easily when the arm has to be placed into another position, the pin is provided with a bent bar 40 which normally rests against the arm 16, but which can be used to turn the pin at a certain angle by which the bar 40 slides over a helical surface 41 till it strikes against a cam 42. The helical surface and the cam are both arranged upon a bent strip 43 or a short part of a tube which is welded on the strip 35. The revolution of the pin 36 is in itself of no importance, but while the bar 40 slides over the helical surface 41 the pin shifts at the same time in its longitudinal direction and that is against the spring pressure so that in this way it can be pulled back from an opening in the arcuated strip 26 and after having adjusted the arm 16 it will be possible to cause the pin put into another opening by means of turning back the bar 40.

The rake shown in Figs. 1 and 2 can be changed into a swath turner by disengaging the locking member (not shown) which prevents the beam 3, 4, respectively, from revolving about the shafts 14, 15, respectively, with regard to the bow 5 and then by rotating the beam 4, 5, respectively, seen from above at about 90° counter clockwise and by locking it again in the new position, the arm 16 at the same time being revolved with regard to the bow 5 in the same direction at an acute angle. At the same time at least any of the running wheels 1 and 2 has to be placed into a suitable new position. The pressure of the rake wheels 10–13 is reduced by means of springs 44 stretched between the beams 3 or 4 and levers on the cranks 6–9.

Instead of holes in the piece of profile material 26, other recesses may be applied in this supporting member, and there is no need that the lock be composed of a pin, but it may have any other suitable shape. In order to prevent bending it is possible to give a greater moment of inertia to that of the legs 27 and 28 of the fork that is charged under strain of pressure. As appears from Fig. 3 a very simple adjustable fastening of the arm 16 to the frame is obtained by using the hinged connection according to the invention, the construction of the fastening having a small height so that the frame does not become unnecessarily high.

What we claim is:

1. A hinge connection adapted to be coupled to a generally horizontal frame member comprising a draw arm including opposite extremities one of which constitutes a hitch section; a pivot, a support rigidly fixed to said frame member and accommodating said pivot with a substantially vertical attitude adjacent one side of the frame member, an arcuate strip fixed to said frame member in a generally horizontal plane at the other side of said member, and a U-shaped device including a transverse member rigidly connected to the other extremity of the draw arm and two legs extending from said transverse member, said device defining between its legs an elongated opening and having its legs coupled to said pivot with the arcuate strip and frame member accommodated in said opening, the hitch portion being positioned at a lower level than said U-shaped device whereby said strip resists vertical displacements of said draw arm.

2. A hinge connection as claimed in claim 1 further comprising locking means on the U-shaped member for locking the same in various selected positions on said arcuate strip.

References Cited in the file of this patent
UNITED STATES PATENTS

| | | |
|---|---|---|
| Re. 15,443 | Arndt | Sept. 5, 1922 |
| 1,435,373 | Blain | Nov. 14, 1922 |
| 2,429,492 | Seranton | Oct. 21, 1947 |
| 2,447,354 | Morrill | Aug. 17, 1948 |
| 2,582,595 | Leveke | Jan. 15, 1952 |
| 2,693,368 | Petron | Nov. 2, 1954 |